(12) United States Patent
Yamamoto

(10) Patent No.: US 8,780,212 B2
(45) Date of Patent: Jul. 15, 2014

(54) CAPTURED IMAGE DISPLAY APPARATUS AND METHOD THEREOF

(75) Inventor: Tatsuya Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/834,716

(22) Filed: Jul. 12, 2010

(65) Prior Publication Data

US 2011/0013093 A1 Jan. 20, 2011

(30) Foreign Application Priority Data

Jul. 16, 2009 (JP) ................................. 2009-168205

(51) Int. Cl.
*H04N 5/225* (2006.01)
*H04N 5/222* (2006.01)

(52) U.S. Cl.
USPC .................................. 348/207.1; 348/333.01

(58) Field of Classification Search
USPC ......... 348/207.1, 333.01, 333.05, 739, 222.1, 348/207.2, 33.01, 220.1, 221.1
See application file for complete search history.

(56) References Cited

U.S. PATENT DOCUMENTS

| 6,867,807 | B2 * | 3/2005 | Malloy Desormeaux | 348/333.13 |
| 7,324,136 | B2 * | 1/2008 | Kubo | 348/220.1 |
| 8,120,672 | B2 * | 2/2012 | Okada et al. | 348/231.2 |
| 2002/0196348 | A1 * | 12/2002 | Kubo | 348/220.1 |
| 2008/0151070 | A1 * | 6/2008 | Shiozawa et al. | 348/222.1 |
| 2008/0174668 | A1 * | 7/2008 | Okada et al. | 348/220.1 |

FOREIGN PATENT DOCUMENTS

JP 2003-298796 A 10/2003

* cited by examiner

*Primary Examiner* — Ahmed A Berhan
(74) *Attorney, Agent, or Firm* — Carter, DeLuca, Farrell & Schmidt, LLP

(57) ABSTRACT

The present invention is directed to a captured image display apparatus that allows a user to swiftly confirm an image concerning a captured image even before receiving of the captured image is completed. A captured image display apparatus includes a live view image receiving unit configured to receive a live view image concerning a captured image from an imaging apparatus, a live view image display unit configured to display the live view image on a display unit when a release notification has been received from the imaging apparatus, a captured image receiving unit configured to receive a captured image from the imaging apparatus, and a captured image display unit configured to display the captured image on the display unit when receiving of the captured image has been completed by the captured image receiving unit.

8 Claims, 5 Drawing Sheets

FIG.7
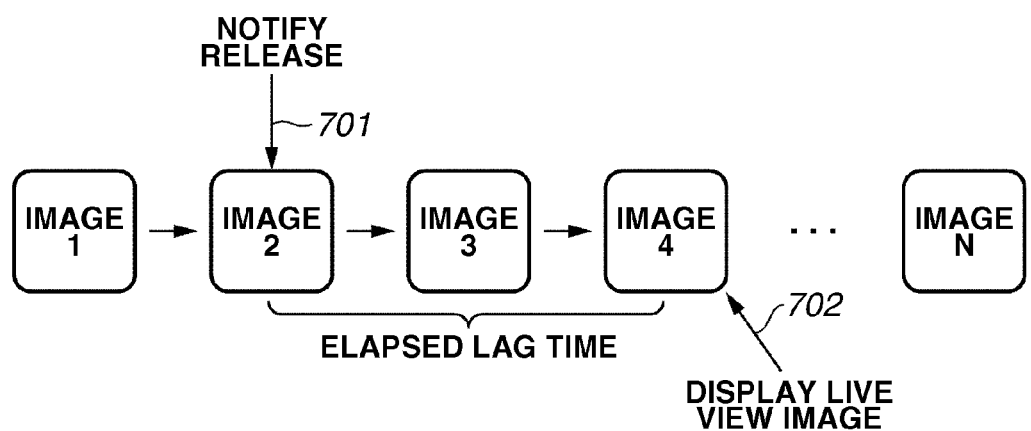
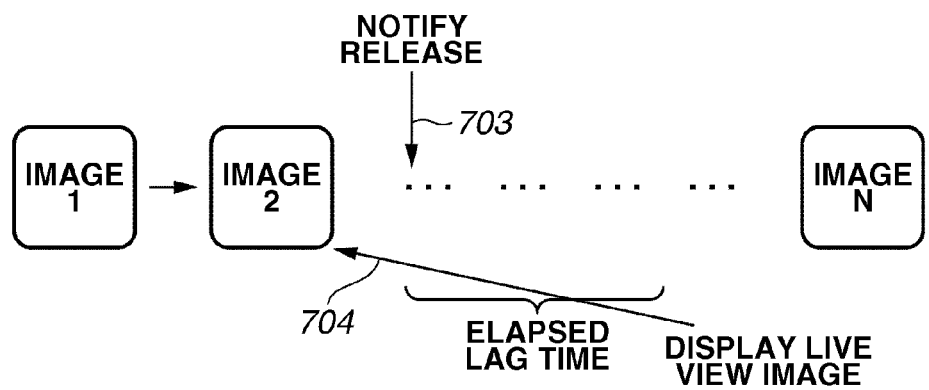

CAPTURED IMAGE DISPLAY APPARATUS AND METHOD THEREOF

BACKGROUND OF THE INVENTION

1. Field of the Invention

The present invention relates to a display apparatus and a display method for displaying a captured image.

2. Description of the Related Art

There is an imaging system to allow an image captured by a camera to be transmitted to a captured image display apparatus via a network and a captured image to be confirmed by the captured image display apparatus. In such a system, there is a method for easily recognizing the image by displaying a partially received image when image data is transferred (refer to Japanese Patent Application Laid-Open No. 2003-298796).

However, there is a problem that when the amount of data of a captured image is large and time is consumed until the captured image display apparatus completes receiving of the captured image, an image is not displayed and a user has to wait. Even by the method discussed in Japanese Patent Application Laid-Open No. 2003-298796, in an image that cannot be displayed by partial data as a compressed image, similarly, a problem arises.

SUMMARY OF THE INVENTION

The present invention is directed to a captured image display apparatus and a captured image display method allowing a user to swiftly confirm an image concerning a captured image even before receiving of the captured image is completed.

According to an aspect of the present invention, a captured image display apparatus includes a live view image receiving unit configured to receive a live view image concerning a captured image from an imaging apparatus, a live view image display unit configured to display the live view image on a display unit when release notification has been received from the imaging apparatus, a captured image receiving unit configured to receive a captured image from the imaging apparatus, and a captured image display unit configured to display the captured image on the display unit when receiving of the captured image has been completed by the captured image receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a live view image displayed by a captured image display apparatus.

DESCRIPTION OF THE EMBODIMENTS

Various exemplary embodiments, features, and aspects of the invention will be described in detail below with reference to the drawings.

Figure 1:
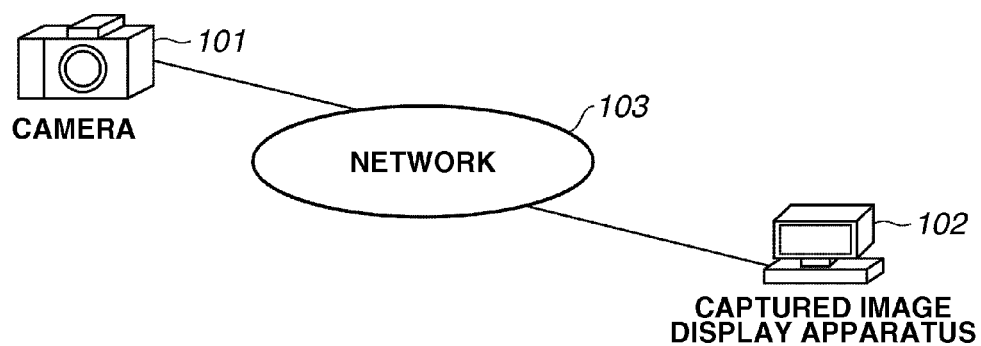
FIG. 1 is illustrates an example of a system configuration of an imaging system.

FIG. 1 illustrates an example of a system configuration of an imaging system. As illustrated in FIG. 1, the imaging system includes a camera 101, which is an example of an imaging apparatus, and a captured image display apparatus (computer) 102. The camera 101 and the captured image display apparatus 102 are connected to a network 103 such as a local area network (LAN) so as to allow data communication. The camera 101 to be connected to the captured image display apparatus 102 may be one camera or a plurality of cameras. When the plurality of cameras is connected, the captured image display apparatus 102 displays an image to be captured by each camera.

Figure 2:
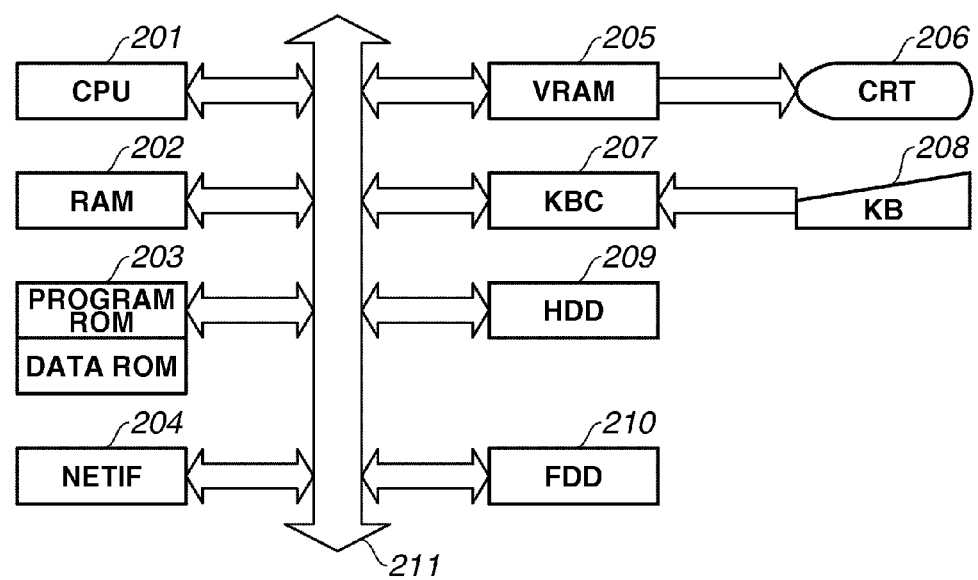
FIG. 2 is a block diagram illustrating an example of a hardware configuration of a captured image display apparatus.

FIG. 2 is a block diagram illustrating an example of a hardware configuration of a captured image display apparatus. A central processing unit (hereinafter, referred to as CPU) 201 is responsible for control of a computer system. A random access memory (hereinafter, referred to as RAM) 202 functions as a main memory of the CPU 201, an area of an execution program, an execution area of a program, and a data area.

A read only memory (hereinafter, referred to as ROM) 203 records an operation processing procedure of the CPU 201. The ROM 203 includes a program ROM storing basic software (operating system (OS)) that is a system program to execute device control of a computer system and a data ROM storing information or the like necessary to operate a system. Instead of the ROM 203, a hard disk drive (HDD) 209, which will be described below, may also be used.

A network interface (hereinafter, referred to as NETIF) 204 executes data receiving from a camera via a network. A video RAM (hereinafter, referred to as VRAM) 205 rasterizes an image to be displayed on a screen on a display device 206, which indicates the state of operation of a computer system and will be described below, and executes control of the display. The display device (hereinafter, referred to as CRT) 206 is, for example, a display.

A controller 207 controls an input signal from an external input device 208, which will be described below. The external input device 208 receives an operation that a user of the computer system performs to the computer system. The external input device 208 includes, for example, a keyboard or the like as an example.

A storage device (hereinafter, referred to as HDD) 209 includes, for example, a hard disk or the like. The HDD 209 is used for storage of application programs and data such as image information. The application program in the present exemplary embodiment includes software program for aiding image capturing, which configures the present exemplary embodiment.

An external input/output device (hereinafter, referred to as FDD) 210 is to input and output, for example, a flexible disk drive, a compact disk read-only memory (CD-ROM) drive, or the like, and is used for reading the above-described application program from a medium. The application program and the data stored in the HDD 209 can also be stored in the FDD 210 and used.

A bus 211 is an input/output bus (address bus, data bus, and control bus) for connecting between the above-described respective units. The CPU 201 executes an application program stored in a storage unit such as the HDD 209. Thus, a function illustrated in FIG. 3, which will be described below, and processing on the side of the captured image display apparatus 102 according to a flowchart, which will be described below, are realized.

The camera 101 also includes a CPU, and a storage unit such as a RAM and a ROM. The CPU executes an application program stored in the storage unit. Thus, processing on the side of the camera 101 according to a flowchart, which will be described below, is realized.

Figure 3:
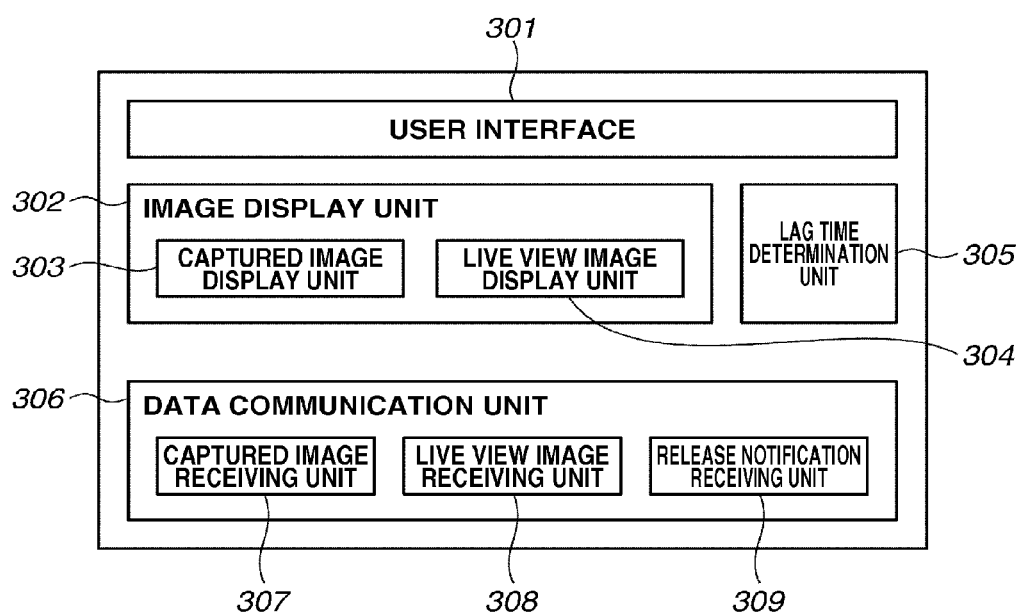
FIG. 3 is a block diagram illustrating an example of a software configuration of a captured image display apparatus.

FIG. 3 is a block diagram illustrating an example of a software configuration of a captured image display apparatus.

A user interface 301 provides a user with the function of receiving input from the user and displaying information (image). An image display unit 302 includes a captured image display unit 303 configured to display a captured image and a live view image display unit 304 configured to display a live view image. The image display unit 302 switches images to be displayed using these to display images through the user interface.

A lag time determination unit 305 determines a lag time. The lag time determined by the lag time determination unit 305 is used in the live view image display unit 304. A data communication unit 306 includes a captured image receiving unit 307 configured to receive a captured image, a live view image receiving unit 308 configured to receive a live view image, and a release notification receiving unit 309 configured to receive release notification. Data received by the data communication unit 306 is used for control of the image display unit 302.

Figure 4:
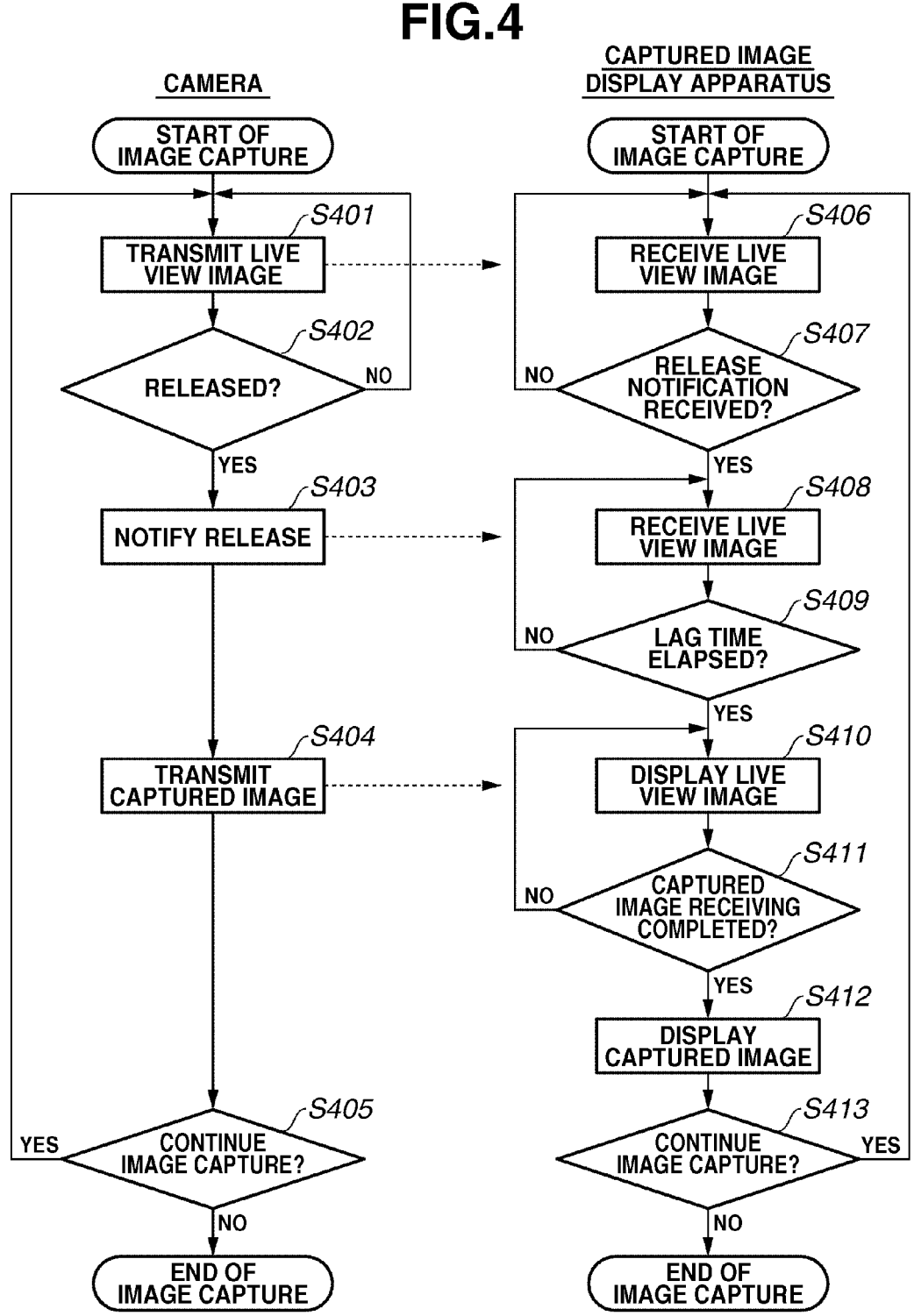
FIG. 4 is a flowchart illustrating display processing of a captured image in the imaging system.

FIG. 4 is a flowchart illustrating display processing of a captured image in the imaging system.

After start of image capture, in step S401, the camera 101 transmits a live view image to the captured image display apparatus 102. In step S406, the live view image receiving unit 308 on the captured image display apparatus 102 receives the live view image. The captured image display apparatus 102 does not immediately display the received live view image and stores it in the storage unit such as the HDD 209.

In step S402, when the camera 101 has detected release (YES in step S402), the processing proceeds to step S403. In step S403, release notification is transmitted to the captured image display apparatus 102. In step S404, a captured image is transmitted to the captured image display apparatus 102. In step S407, the release notification receiving unit 309 on the captured image display apparatus 102 confirms whether release notification is received.

When the release notification is received (YES in step S407), then in step S409, the release notification receiving unit 309 confirms whether a lag time determined by the lag time determination unit 305 has elapsed. Until the lag time elapses, in step S408, the release notification receiving unit 309 continues to receive the live view image.

When the lag time has elapsed (YES in step S408), the processing proceeds to step S410. In step S410, the live view image display unit 304 displays the received live view image on a display unit such as the CRT 206. In step S411, the captured image receiving unit 307 waits for receiving of a captured image to be completed.

When receiving of the captured image has been completed (YES in step S411), the processing proceeds to step S412. In step S412, the captured image display unit 303 displays the received captured image on the display unit such as the CRT 206.

When release is not detected (NO in step S402), then in step S401, the camera 101 continues to transmit a live view image to the captured image display apparatus 102. When release notification is not received (NO in step S407), the captured image display apparatus 102 continues to receive a live view image in step S406.

In step S405, the camera 101 confirms whether image capture is continued. When image capture is continued (YES in step S405), the processing proceeds to step S401. Similarly, in step S413, the captured image display apparatus 102 confirms whether image capture is continued. When image capture is continued (YES in step S413), the processing proceeds to step S406.

Figure 5:
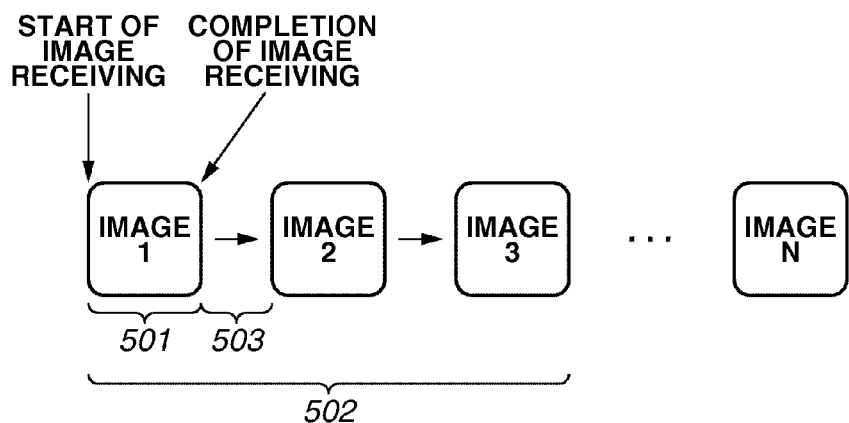
FIG. 5 illustrates an example of information that can be used when a captured image display apparatus determines time lag based on a receiving situation of a live view image from a camera.

FIG. 5 illustrates an example of information that can be used when a captured image display apparatus determines time lag based on a receiving situation of a live view image to be received from a camera. When the captured image display apparatus 102 has been continuously received live view images from an image 1 to an image N, a period (time) 501 indicates a period from the start of receiving one image to the completion thereof.

The lag time determination unit 305 can determine a receiving time per one image from the period 501. A period (time) 502 represent a period for receiving a plurality of images. The lag time determination unit 305 can determine the number of received images per unit time from the period 502. A period (time) 503 represents a period from the completion of an image reception to the start of a next image reception. The lag time determination unit 305 can determine, from the period 503, an interval between receptions of two images.

If lag time is the sum of a receiving time per one image and an interval between the receptions of the two images, the lag time determination unit 305 can display a live view image next to an image received after release notification.

Figure 6:
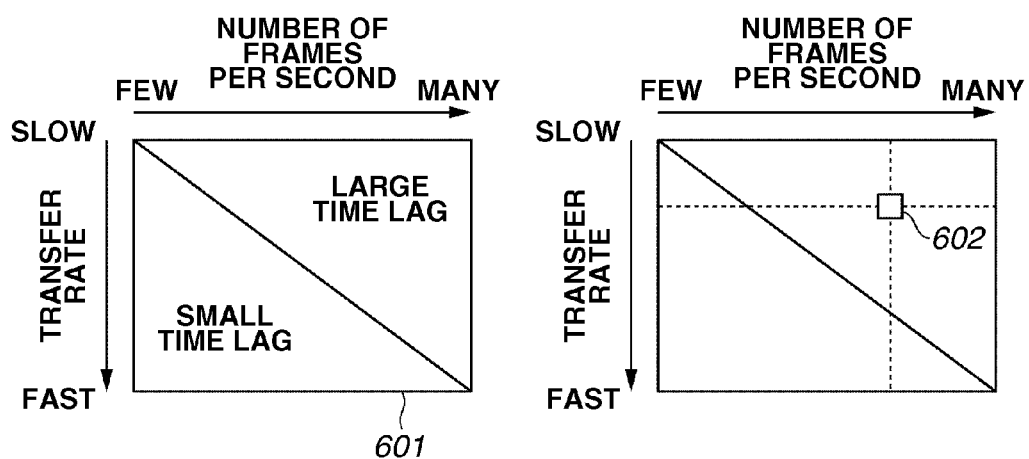
FIG. 6 illustrates an example of a method for determining a lag time.

FIG. 6 illustrates an example of a method for determining a lag time by calculating a transfer rate from a receiving time per one image, calculating the number of frames per second from the number of received images per unit time, and using these values.

In the storage unit on the captured image display apparatus 102, a table of a lag time having XY axes of a transfer rate and the number of frames per second respectively as the table 601 is stored. The lag time determination unit 305 determines a value present at a position 602, which is an intersection of the calculated transfer rate and the number of frames per second as a lag time. This allows the captured image display apparatus 102 to display an image that is two images or more subsequent to the received image after release notification.

FIG. 7 illustrates an example of a live view image displayed by a captured image display apparatus. When live view images from an image 1 to an image N are continuously received, the captured image display apparatus 102 will wait for from release notification 701 to an elapse of lag time, and display the live view image 702.

When the lag time is short or a problem arises on the network, no live view image may be received, even if waiting for a time period from release notification 703 to the elapse of a lag time. In this case, the captured image display apparatus 102 can display an image received before release notification 703 as the last received live view image.

According to the above-described each exemplary embodiment, the captured image display apparatus 102 can display a live view image similar to (relate to) a captured image during a time period from the release notification to the reception completion of the captured image. Thus, a user can confirm the captured image without waiting for the captured image to be displayed. Further, the captured image display apparatus 102 displays from the live view image to the captured image in a stepwise manner, thereby reducing a waiting time of the user.

Exemplary embodiments of the present invention have been described in detail above. However, the present invention is not limited to a specific exemplary embodiment but in the scope of the subject matter of the present invention described in the claims, various modifications and changes can be made.

As described above, according to the present invention, even before receiving of a captured image is completed, a user can swiftly confirm an image concerning a captured image.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-168205 filed Jul. 16, 2009, which is hereby incorporated by reference herein in its entirety.

What is claimed is:

1. An image display apparatus comprising:
a receiver configured to:
receive a release notification from an imaging apparatus connected to the image display apparatus via a network, wherein the release notification indicates that the imaging apparatus detects an imaging instruction for capturing an image;
receive a plurality of live view images from the imaging apparatus, wherein the plurality of live view images are imaged by the imaging apparatus regardless of the imaging instruction; and
receive the captured image from the imaging apparatus after the release notification has been received, wherein the image is captured by the imaging apparatus in accordance with the imaging instruction;
a processor configured to determine a period to display a live view image following receipt of the release notification by the release notification receiving unit; and
a display controller configured to control a display unit to display a live view image from the plurality of live view images during the period to confirm reception of the captured image before the reception of the captured image is completed, and display the captured image on the display unit, after the live view image is displayed, once the captured image has been completely received, wherein, in a case that no live view image is received after the release notification has been received, the display controller controls the display unit to display the last live view image received before the release notification has been received, and in a case that a live view image is received after the release notification has been received, the display controller controls the display unit to display the received live view image.

2. The image display apparatus according to claim 1, wherein processor determines the period based on a transfer rate of the imaging apparatus to transmit the plurality of live view images and a lag time between a receiving completion time of a live view image and a receiving start time of the next live view image.

3. The image display apparatus according to claim 1, wherein the display controller is further configured to control the display unit to switch from display of the live view image to display of the captured image in a case that the captured image has been completely received.

4. The image display apparatus according to claim 1, wherein the display controller is configured to control the display unit to display the live view image on the display unit only in a case that the release notification has been received from the imaging apparatus.

5. The image display apparatus according to claim 1, receiver receives the release notification from the imaging apparatus of a plurality of imaging apparatuses connected to the image display apparatus via the network.

6. The image display apparatus according to claim 1, wherein the network is a local area network (LAN).

7. A method for displaying an image executed by an image display apparatus, the method comprising:
receiving a release notification from an imaging apparatus connected to the image display apparatus via a network, wherein the release notification indicates that the imaging apparatus detects an imaging instruction for capturing an image;
receiving a plurality of live view images from the imaging apparatus, wherein the plurality of live view images are imaged by the imaging apparatus regardless of the imaging instruction;
receiving the captured image from the imaging apparatus after the release notification has been received, wherein the image is captured by the imaging apparatus in accordance with the imaging instruction;
determining a period to display a live view image following receipt of the release notification;
displaying a live view image from the plurality of live view images during the period to confirm reception of the captured image before the reception of the captured image is completed; and
displaying the captured image, after the live view image is displayed, once the captured image has been completely received,
wherein, in a case that no live view image is received after the release notification has been received, the last live view image being received before the release notification has been received is displayed, and in a case that a live view image is received after the release notification has been received, the received live view image is displayed.

8. A non-transitory computer-readable recording medium storing a program for causing a computer to execute a method for displaying an image, the method comprising:
receiving a release notification from an imaging apparatus connected to an image display apparatus via a network, wherein the release notification indicates that the imaging apparatus detects an imaging instruction for capturing an image;

receiving a plurality of live view images from the imaging apparatus, wherein the plurality of live view images are imaged by the imaging apparatus regardless of the imaging instruction;

receiving the captured image from the imaging apparatus after the release notification has been received, wherein the image is captured by the imaging apparatus in accordance with the imaging instruction;

determining a period to display a live view image following receipt of the release notification;

displaying a live view image from the plurality of live view images during the period to confirm reception of the captured image before the reception of the captured image is completed; and displaying the captured image, after the live view image is displayed, in a case that the captured image has been completely received, wherein, in a case that no live view image is received after the release notification has been received, the last live view image being received before the release notification has been received is displayed, and in a case that a live view image is received after the release notification has been received, the received live view image is displayed.

* * * * *